United States Patent [19]

Yang et al.

[11] 4,035,152

[45] July 12, 1977

[54] DISTRIBUTION PLATE FOR RECIRCULATING FLUIDIZED BED

[75] Inventors: Wen-ching Yang, Export; Edward J. Vidt; Dale L. Keairns, both of Pittsburgh, all of Pa.

[73] Assignee: The United States of America as represented by the United States Energy Research and Development Administration, Washington, D.C.

[21] Appl. No.: 689,625

[22] Filed: May 24, 1976

[51] Int. Cl.² .................. B05B 1/14; B01J 8/44
[52] U.S. Cl. .................. 23/284; 23/288 S; 201/31; 34/57 A; 432/15; 239/590.5

[58] Field of Search ............ 23/284, 288 S; 201/31; 34/57 A; 432/15; 239/590.5

[56] References Cited

U.S. PATENT DOCUMENTS

| 2,607,666 | 8/1952 | Martin | 48/62 R |
|---|---|---|---|
| 2,709,675 | 5/1955 | Phinney | 23/288 S X |
| 2,975,037 | 3/1961 | Lake | 23/284 X |
| 3,463,617 | 8/1969 | Takeuchi | 23/284 |

Primary Examiner—James H. Tayman, Jr.

[57] ABSTRACT

A distribution plate for a recirculating fluidized bed has a centrally disposed opening and a plurality of apertures adjacent the periphery to eliminate dead spots within the bed.

4 Claims, 4 Drawing Figures

DISTRIBUTION PLATE FOR RECIRCULATING FLUIDIZED BED

BACKGROUND OF THE INVENTION

This invention relates to fluidized beds and more particularly to a distribution plate for a recirculating fluidized bed.

Recirculating fluidized beds are utilized for processing fossil fuels, for vertical pneumatic transportation of sticky and bridging granular material, and in general for promoting mixing, circulation, heat and mass transfer in any particulate material.

Recirculating fluidized beds are also utilized in maintaining uniform temperature throughout the bed and for handling reactants which normally produce agglomeration problems when added in reasonable quantities to a recirculating bed.

One particular application of such a recirculating fluidized bed is in the processing of coal for power generation. The process is being tested for producing power via a coal gasification process in which limestone is fed into the fluidized bed to desulfurize the fuel gas to improve the quality of the stack effluent and economically produce electrical power.

SUMMARY OF THE INVENTION

In general, a distribution plate for a fluidized bed of particulate material having a centrally disposed, generally vertical draft tube, when made in accordance with this invention, comprises a generally flat plate coextensive with the lower portion of the fluidized bed, an opening registering with the draft tube centrally disposed in the plate and a plurality of apertures disposed adjacent the periphery of the plate. The fluidized bed also comprises a supply of pressurized fluid to the central opening and a supply of pressurized fluid to the apertures, whereby the particulate material in the fluidized bed is circulated upwardly through the draft tube and downwardly along the outside of the draft tube without forming dead spots within the fluidized bed.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
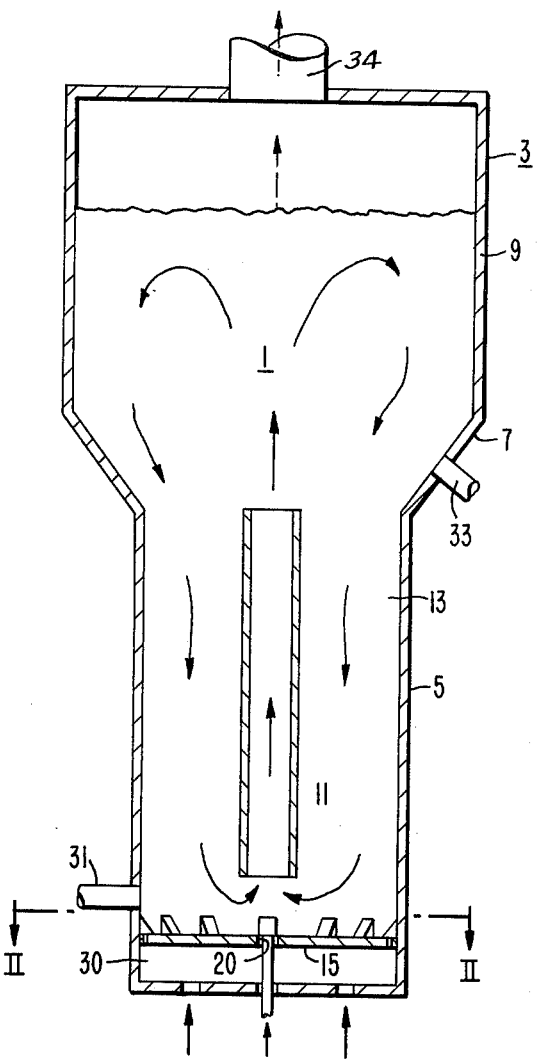
FIG. 1 is a sectional view of a recirculating fluidized bed.

Referring now to the drawings in detail, and in particular to FIG. 1, there is shown a recirculating fluidized bed 1 housed in a cylindrical vessel 3 having a lower portion 5 of one diameter, a frustro-conical shaped transition member 7 which flares upwardly and outwardly from the lower portion 5, and an upper portion 9 larger in diameter than the lower portion 5.

A draft tube 11 is centrally disposed in the lower portion 5 of the vessel 3 and extends vertically through the lower portion 5 producing an annular chamber 13 between the draft tube 11 and walls of the lower portion 5 of the vessel 3. The draft tube 11 generally extends to the upper end of the lower portion 5 of the vessel 3 and is spaced from a distribution plate 15 disposed in the bottom of the lower portion 5 of the vessel 3. The distribution plate 15 is generally a flat plate transversely disposed in the lower portion 5 of the vessel 3 and is generally coextensive therewith, the periphery thereof being contiguous with the walls of the lower portion 5 of the vessel 3.

Figure 2:
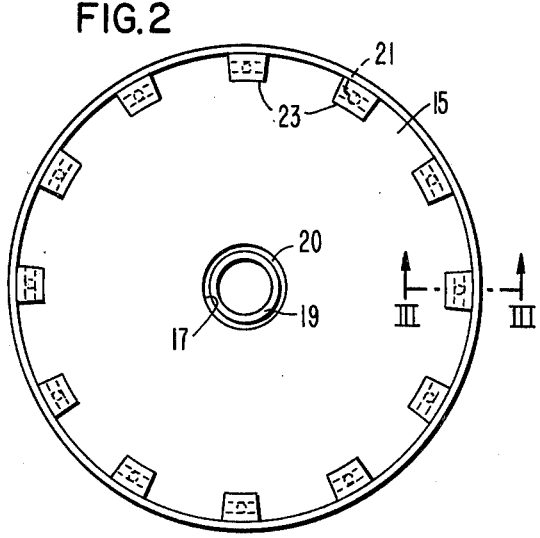
FIG. 2 is a sectional view taken on line II—II of FIG. 1.

The distribution plate 15, as shown in FIG. 2, has an opening 17 centrally disposed therein. The opening 17 registers with the draft tube 11. A conduit 19 or other means supplies solids carried pneumatically in a pressurized gaseous fluid to the fluidized bed 1 and draft tube 11 through the opening 17 in the distribution plate 15. There is also pressurized gaseous fluid supplied to the draft tube 11 through the annular space 20 between the conduit 19 and the opening 17.

The distribution plate 15 also has a plurality of apertures 21 symmetrically spaced adjacent the periphery thereof. Except for the central opening 17 and the apertures 21, the distribution plate 15 is generally imperforate.

Figure 3:
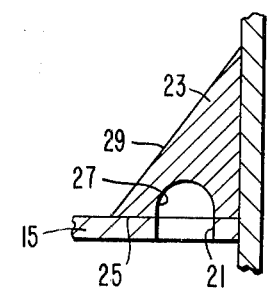
FIG. 3 is a partial sectional view taken on line III—III of FIG. 2.

Wedge-shaped blocks 23, shown best in FIG. 3, are disposed over the apertures 21. The wedge-shaped blocks 23 have a base 25, which rests on the distribution plate 15. The base 25 has a groove 27 traversing the base 25. The groove 27 has a semi-circular cross-section and registers with the associated aperture 21. The groove 27 is generally disposed chordally adjacent the periphery of the distribution plate 15.

The wedge-shaped blocks 23 are generally formed so that their cross-section is a right angle and has a surface 29 which coincides with the hypotenuse of the right triangle. The surface 29 slopes inwardly and downwardly from the walls of the lower portion 5 of the vessel 3. The angle formed between the surface 29 and the distribution plate 15 is greater than the angle of repose of the particulate material forming the fluidized bed so that the blocks 23 form a cap, which protects the apertures 21 to prevent particulate material from dropping through the apertures 21, when the fluidized bed is shut down, and to prevent the collection of particulate material above the cap, when the fluidized bed is in operation. A space or other means is provided below the distribution plate 15 to form a plenum chamber 30 and pressurized gaseous fluid is supplied thereto in order to direct pressurized fluid to the apertures 21. The pressurized fluid flowing through the apertures 21 and grooves 27 forms jets, which impinge on neighboring jets to create sufficient turbulence to agitate nearby particulate material to prevent dead spots adjacent the walls of the vessel 3 and adjacent the distribution plate 15. The central opening 17, the draft tube 15, the aperture 21, and the block 23 cooperate to produce a recirculating fluidized bed free from dead spots.

A particulate material inlet nozzle 31 is disposed in the lower portion of the vessel 3 above the distribution plate 15 serving as an alternate material inlet to conduit 19 disposed in the bottom of the vessel. A particulate material outlet nozzle 33 is disposed in the transition member 7. The disposition of these nozzles may be varied depending on the property of the fluidized bed and the characteristics of the influent and effluent particulate material.

A gas outlet nozzle 34 is centrally disposed in the upper portion of the vessel 7 for removing fluidizing gas from the vessel 3.

Figure 4:
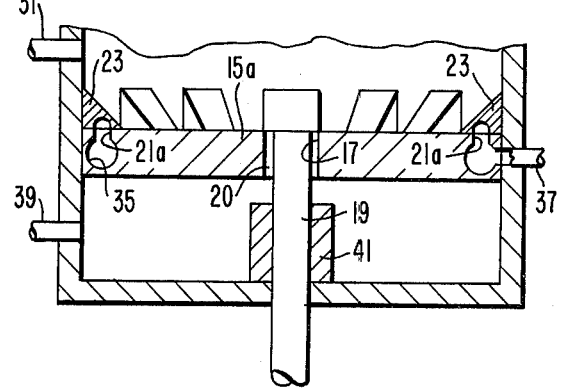
FIG. 4 is an alternate partial sectional view of the distribution plate.

FIG. 4 shows an alternate distribution plate 15a. The distribution plate 15a has an annular header 35 disposed therein adjacent the outer periphery. A fluidizing gas inlet nozzle 37 is disposed in fluid communication with the header 35 and a plurality of apertures 21a deliver the fluidizing gas from the header 35 to the outer periphery of the fluidized bed. Another fluidizing gas inlet nozzle 39 is disposed in the walls of the vessel 3 to supply fluidizing gas to a plenum chamber under the distribution plate 15a and to the annular space 20 between the conduit 19 and the opening 17.

An annular block 41 is disposed below the annular opening 20 in a spaced relationship with the distribution plate 15a and tightly embracing the conduit 19, to prevent particulate from falling into the plenum chamber when the unit is shut down. Blocks 23 are disposed above the operation similar to those shown in FIGS. 1 through 3 and operate in the same manner.

The recirculating fluidized beds hereinbefore described have many diverse uses, one of which is in a coal gasification process utilized in the production of power, but irrespective of the uses to which the recirculating fluidized bed is applied the rate of recirculation may be controlled by varying the amount of gaseous fluid supplied to the draft tube and supplied to the apertures and no dead spots will occur at any recirculation rate.

What is claimed is:

1. A distribution plate for a fluidized bed of particulate material having a centrally disposed generally vertically draft tube, said distribution plate comprising a generally flat plate coextensive with the lower portion of said fluidized bed, an opening registering with said draft tube centrally disposed within said plate, a plurality of apertures disposed adjacent the periphery of said plate, a plurality of wedge shaped cover blocks having grooves extending across each block, said grooves being disposed to register with said apertures, said cover blocks being disposed so that one surface thereof slopes downwardly and inwardly from the periphery of said plate, means for supplying pressurized fluid to said central opening and means for supplying pressurized fluid to said apertures, whereby said particulate material is fluidized and circulated upwardly through the draft tube and downwardly around the outside of said draft tube with no dead spots occurring within the fluidized bed.

2. The distribution plate as set forth in claim 1, wherein the grooves have a semi-circular cross-section.

3. The distribution plate as set forth in claim 1, wherein the grooves are generally chordally disposed adjacent the periphery of the distribution plate.

4. The distribution plate as set forth in claim 1, wherein the angle of the slope of the one surface of the wedge-shaped block is greater then the angle of repose of the particulate material forming the fluidized bed.

* * * * *